(12) United States Patent
Specht et al.

(10) Patent No.: US 6,527,299 B2
(45) Date of Patent: Mar. 4, 2003

(54) DEVICE FOR TIGHTENING A REAR SEAT BELT

(75) Inventors: Martin Specht, Feldafing (DE); Andreas Knych, München (DE)

(73) Assignee: Breed Automotive Technology, Inc., Lakeland, FL (US)

(*) Notice: Subject to any disclaimer, the term of this patent is extended or adjusted under 35 U.S.C. 154(b) by 42 days.

(21) Appl. No.: 09/930,519

(22) Filed: Aug. 15, 2001

(65) Prior Publication Data

US 2002/0105181 A1 Aug. 8, 2002

(30) Foreign Application Priority Data

Feb. 7, 2001 (DE) .......................................... 101 05 500

(51) Int. Cl.[7] .............................................. B60R 22/36
(52) U.S. Cl. ...................... 280/806; 297/480; 280/808
(58) Field of Search ............................ 280/806, 801.1, 280/807, 808; 297/480, 468, 483

(56) References Cited

U.S. PATENT DOCUMENTS

| 4,350,369 | A |   | 9/1982  | Chika ........................ 280/804 |
| 4,767,161 | A | * | 8/1988  | Sedlmayr et al. ........... 297/472 |
| 4,968,059 | A | * | 11/1990 | Motozawa et al. ......... 280/806 |
| 5,295,714 | A |   | 3/1994  | Fohl ............................. 280/806 |
| 5,492,368 | A | * | 2/1996  | Pywell et al. ............... 280/806 |
| 5,519,997 | A |   | 5/1996  | Specht ......................... 60/632 |
| 5,571,253 | A | * | 11/1996 | Blackburn et al. ......... 180/282 |
| 5,588,677 | A | * | 12/1996 | Kopetzky et al. .......... 280/806 |
| 5,609,367 | A |   | 3/1997  | Eusebi et al. ............... 280/808 |
| 5,873,599 | A |   | 2/1999  | Bauer et al. ................. 280/806 |
| 6,179,330 | B1 | * | 1/2001 | Wier ............................ 280/806 |
| 6,186,549 | B1 |   | 2/2001 | Specht et al. ............... 280/806 |
| 6,238,003 | B1 | * | 5/2001 | Miller et al. ................. 297/480 |
| 6,340,176 | B1 |   | 1/2002 | Webber et al. .............. 280/805 |
| 6,447,011 | B1 | * | 9/2002 | Vollmer ....................... 280/806 |

FOREIGN PATENT DOCUMENTS

| DE | 8529017  | 10/1987 |
| DE | 29606896 | 9/1996  |
| DE | 29904404 | 8/1999  |

* cited by examiner

Primary Examiner—Paul N. Dickson
Assistant Examiner—David R. Dunn
(74) Attorney, Agent, or Firm—Lonnie Drayer

(57) ABSTRACT

A device for tightening a three-point seat belt is located in the rear of a vehicle. A linear belt tightener is located in the region of the vehicle door sill aligned essentially parallel to the vehicle door sill. The linear belt tightener acts via a pulling element on the belt webbing of a seat belt. The belt webbing is guided through a belt guide anchored to the vehicle body.

19 Claims, 3 Drawing Sheets

DEVICE FOR TIGHTENING A REAR SEAT BELT

FIELD OF THE INVENTION

The present invention relates to a device for tensioning a three-point seat belt located in the rear of a vehicle.

DISCUSSION OF THE PRIOR ART

DE 85 29 017 U1 teaches a device having anchoring points with a belt buckle of a seat belt retracted by an electrically activated linear belt tightener. The linear belt tightener, which can comprise a pyrotechnic piston driven in a cylinder, acts upon and retracts the seat belt buckle in the event of a crash to tighten the seat belt.

The three anchoring points of a three-point seat belt are the belt buckle, an end fitting located at the end of the belt webbing and fastened to the vehicle body, and a belt guide at approximately shoulder height or, if necessary, adjustable in height, around which the seat belt webbing is guided to a seat belt retractor.

SUMMARY OF THE INVENTION

There is provided in accordance with the present invention a device for tightening a three-point seat belt located in the rear of a vehicle comprising: a linear belt tightener located in the region of a vehicle door sill that extends between a B-column and a C-column of a vehicle, the linear belt tightener being aligned essentially parallel to the vehicle door sill, the linear belt tightener engaging a pulling element attached to a seat belt webbing that is guided through a belt guide anchored to a vehicle body, the pulling element is moved approximately parallel to the vehicle door sill during the tightening process.

DETAILED DESCRIPTION OF THE INVENTION

As used herein and in the claims terms such as front, back, above, below, top, bottom, forward, rearward, and the like should be understood to refer to directions in regards to a motor vehicle in which a device according to the invention disclosed herein has been installed.

Figure 1:
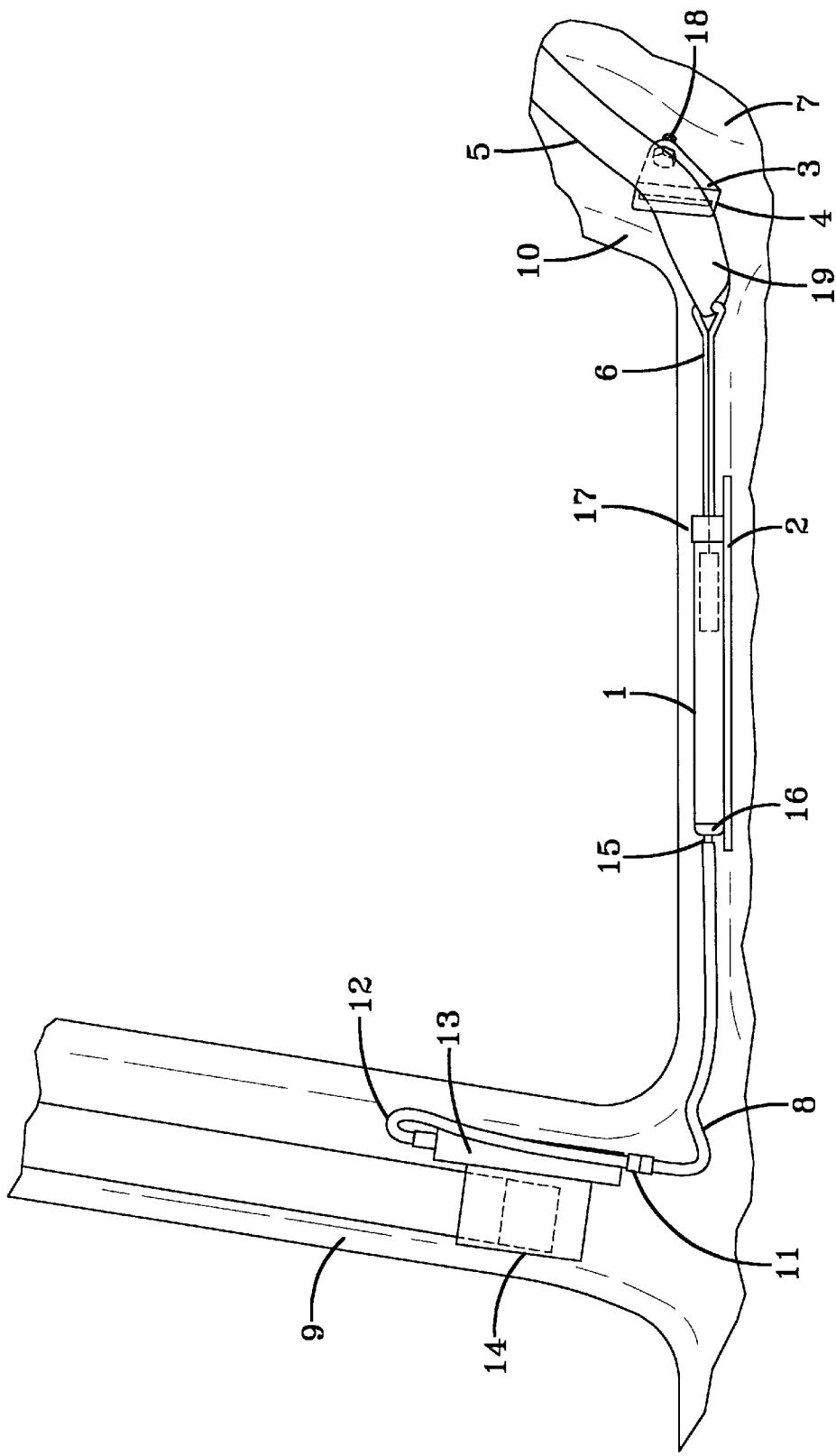
FIG. 1 is a diagrammatic view of an embodiment of the invention.

The embodiment represented in FIG. 1 has a linear belt tightener 1 located in the region of a vehicle door sill 2 that extends between the B-column 9 and the C-column 10 of a vehicle body. The linear belt tightener is preferably secured to the vehicle door sill 2 and/or a floor panel 17, which shown only in part. , The linear belt tightener 1 comprises a cylinder in which a piston, shown in broken lines, is pyrotechnically driven in a known manner. A linear belt tightener of this type is known for instance from U.S. Pat. No. 6,186,549 or 5,519,997 for tightening a seat belt. It is also possible, however, to design the linear belt tightener as an electrically operated actuator.

The linear belt tightener 1 has a pulling element 6 that is connected to one end of the belt webbing 5 of a seat belt. The belt webbing 5 is deflected by a belt guide 4. The belt guide 4 is located at approximately the end of the vehicle door sill 2, in particular at a location where the vehicle body 7 is angled in the region in where the vehicle door sill 2 and the C-column 10 coincide. This located concealed by the upholstery of the rear seat or the rear bench.

Figure 2:
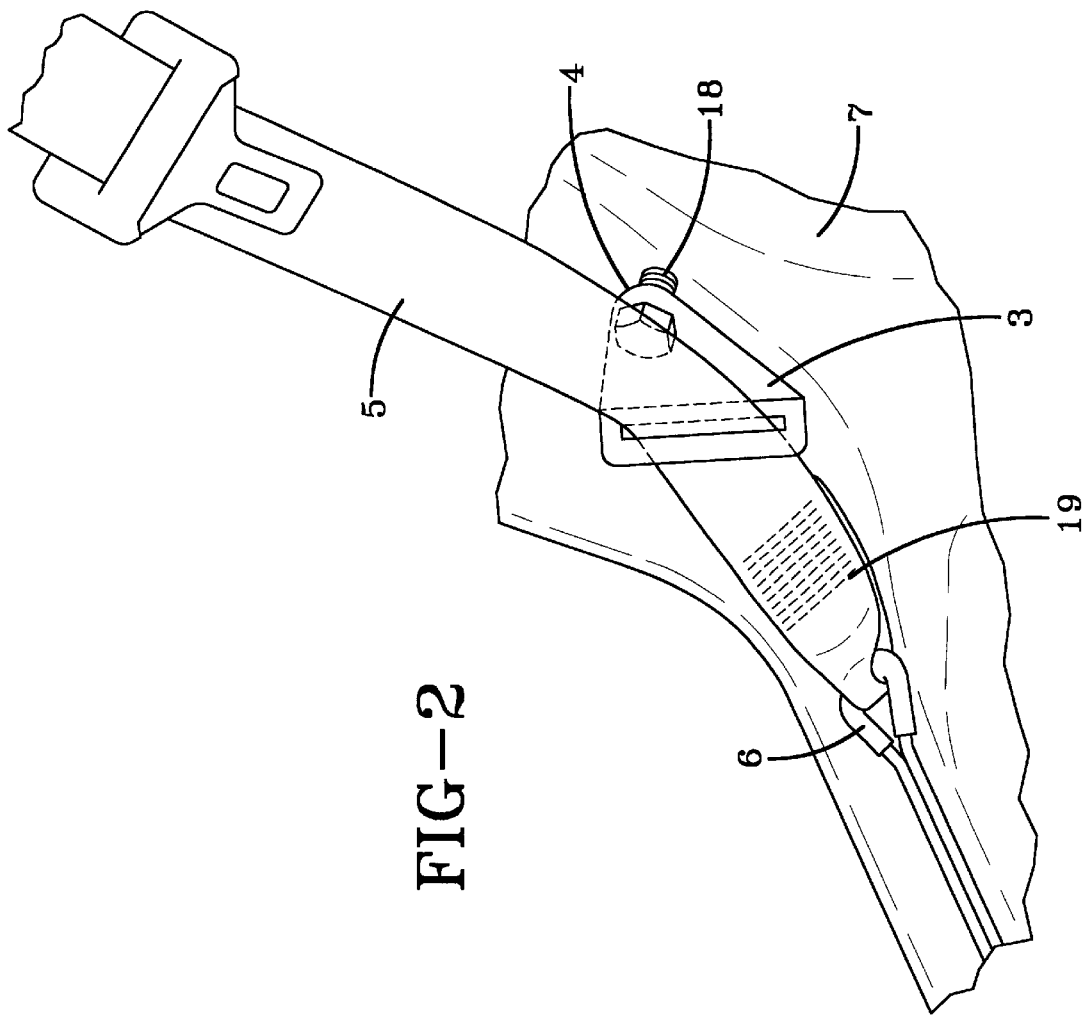
FIG. 2 shows a belt guide that can be employed in the embodiment shown in FIG. 1.

As shown in the figures, the belt guide 4 comprises a deflection bar 3, around which the belt webbing coming from above is deflected in a direction running approximately parallel to the vehicle door sill 2. The deflection bar 3 is oriented obliquely to the vehicle door sill, at a 90° deviating angle, preferably at an angle of approximately 45° to the longitudinal center line of the deflected belt webbing 5, as shown in FIG. 2. In the figures, the belt webbing 5 is in a resting position, i.e. in a non-fastened state. It has been removed and retracted by the seat belt retractor (not further represented). At the same time, the seat belt retractor forms the anchoring point of the seat belt, foreseen at approximately shoulder height, whereby the belt webbing can be guided in a known manner via another belt guide (not further represented), anchored to the car body at approximately shoulder height.

The angle adopted by the deflection bar ensures that the belt webbing 5 is guided to the upper anchoring point, located at approximately shoulder height of the vehicle occupant, while fitting closely and without folds or creases to the ascending rear back outline of the seat bench or the rear seat, and remaining crease-free. The angle of deflection of the belt webbing by the deflection bar 3 varies according to vehicle type. The belt webbing angle of deflection ensures that in the event of a crash, within a short period of time of approximately 4 milliseconds, approximately 120 millimeters of belt webbing can be drawn through the belt guide of the linear belt tightener 1 with a high expenditure of force. This period of time ensures that the tightening of the belt webbing can take place prior to the forward displacement of the seat belt wearing vehicle occupant. In addition, the belt guide 4 can be deformed during the tightening process and/or pivoted around its anchoring point 18, at which it is secured to the vehicle body 7, due to the forces arising during the tightening process. This ensures that due to the dynamic load during the tightening process the preferably triangular-shaped belt guide assumes the most favorable orientation according to seat belt fastening configurations. This ensures that the belt webbing 5 causes minimal friction, is deflected without causing injury, and is retracted through the belt guide 4 by the linear belt tightener 1.

During the initial phase of a crash, i.e. during the approximately first 15 milliseconds approximately 30 to 35 millimeters of chest belt webbing is retracted through the buckle tongue anchored in the belt buckle, via the lap belt to which the belt webbing 5 shown in the figures leads. Due to the direct belt webbing retraction at the lap belt, the belt force effects on the seat belt wearing vehicle occupant are favorably affected in two respects. On one hand, the pressure exerted by the chest belt is reduced by as much as 10 to 20%. On the other hand, the peak restraint force on the lap belt that occurs during the crash is more even and reduced.

In the embodiment shown in FIGS. 1 and 2, the pulling element 6 of the linear belt tightener 1 acts upon the end 19 of the belt webbing. This pulling element can be a pull bar, traction cable or the like. The pulling element 6 is firmly connected to a driving part driven in the linear belt tightener, for instance to a pyrotechnically driven piston, which is shown in broken lines. The movement of the pulling element 6 during the tightening process is directed towards the front of the vehicle. During the belt tightening process the belt webbing 5, which lies above the seat surface, is pulled downwards to the belt guide 4.

Since the linear belt tightener 1 can only move in one direction, namely in the belt tightening direction, and is blocked in the opposite direction by a blocking element, the linear belt tightener, along with the belt guide 4, functions during normal driving conditions as an end fitting with which the end 19 of the belt webbing is anchored to the vehicle body. At the same time, this arrangement creates a final fitting tightener, through which the seat belt, for instance in the event of a crash, is tightened. Here traction is exerted on the belt webbing 5 from below. When fastening a child's safety seat with the help of the seat belt of the rear seat or bench of the vehicle, the child's safety seat is drawn into the seat upholstery.

An electrical cable 8 extends between a front end 15 of the linear belt tightener 1, and an electrical connection or junction point. Preferably the electrical connection or junction point is a plug-in connection 11 in the region of the B-column 9 of the vehicle provided with plugs and plug sockets or other suitable connection means. The electrical cable 8 conducts a current to an igniter which ignites a propellant in the cylinder or in a working area of the cylinder of the linear belt tightener 1. This propellant can alternatively be located in the drive piston of the linear drive 1. At the front end 15 of the linear belt tightener 1 a plug socket 16 is provided to ensure the conductive integrity of the cable 8 with the igniter in the linear belt tightener 1. A line (not further represented) can run in the linear belt tightener 1 from the plug socket 16 to the igniter. At the electrical plug-in connection 11, which is located in the region of the B-column 9, a further plug socket can be provided to ensure the conductive integrity of the cable 8. An igniter of a second tightening drive 13 can be connected to the electrical plug-in connection 11 via a further cable 12. The second tightening drive 13 serves as a tightening drive for a belt reel of a seat belt retractor 14 that is secured to the B-column 9. Therefore a common electrical connection or junction point, in particular a plug-in connection 11 for the current supply of the igniter of both these tightening drives, is provided for the linear belt tightener 1 and the tightening drive 13. The cables 8, 12 may be current supply cables if both tightening drives 1, 13 are electrical actuators, i.e. as electrical tightening drives.

Due to the arrangement shown in FIG. 1, a reduction in the length of the electrical cable 8 can be achieved. This cable merely requires a length that corresponds to the distance from the front end 15 of the linear belt tightener 1 to the B-column 9.

Figure 3:
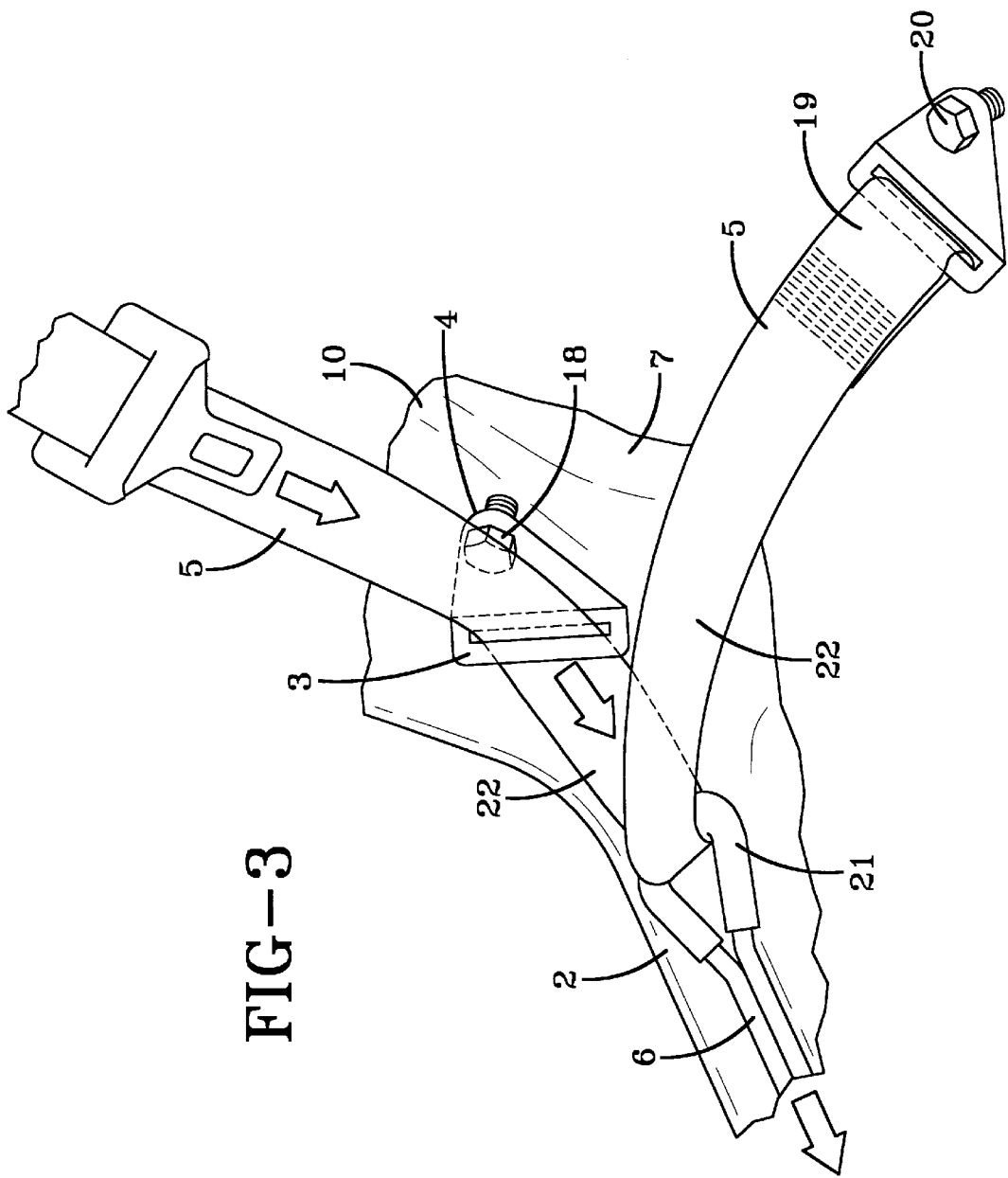
FIG. 3 shows a further embodiment of the invention.

In the embodiment shown in FIG. 3, the pulling element 6 acts upon a belt web loop 22 of the belt webbing 5 retracted through the belt guide 4. The other components are the same as in the embodiment shown in FIGS. 1 and 2. The belt web loop comprises two strands that are guided through a second belt guide 21 foreseen on the pulling element 6. The pulling element 6 acts upon the web loop 22 by this second belt guide 21. The end 19 of the belt webbing on the one strand of the web loop 22 is secured to a second anchoring point 20 on the vehicle body 7. In the embodiment shown in FIG. 3 two anchoring points 18, 20 are provided. Alternatively, both anchoring points 18, 20 can be joined to form a common anchoring point. In the embodiment shown in FIG. 3, similarly to a pulley block, a double belt webbing retraction length is achieved through the belt guide 4 during the movement of the pulling element 6 by the linear belt tightener 1.

The deflection bar 3 of all the embodiments and the deflection bar of the second belt guide 21 of FIG. 3 preferably provide at the deflection areas surfaces that cause little friction.

Due to the arrangement of the linear tightening drive in the door sill region and the normally present carpet, the tightening noise which is particularly loud when a pyrotechnically driven tightener is activated is further away from the head of the vehicle occupant. A multistage force system for the three-point seat belt in the rear region of the vehicle can be provided, whereby the function of the tightening drive and the function of a force limitation after the tightening of the seat belt can be foreseen in separate components of the seat belt. The translational tightening movement requires lower energy than that a rotary tightening movement. A force limitation action can be integrated in the linear belt tightener.

From the foregoing, it will be apparent to those skilled in the art that modifications may be made without departing from the spirit and scope of the invention. Accordingly, the invention is not intended to be limited except as may be made necessary by the appended claims.

We claim:

1. A device for tightening a three-point seat belt located in the rear of a vehicle comprising:

a linear belt tightener located in the region of a vehicle door sill that extends between a B-column and a C-column of a vehicle, the linear belt tightener being aligned essentially parallel to the vehicle door sill, the linear belt tightener engaging a pulling element attached to a seat belt webbing that is guided through a belt guide anchored to a vehicle body, the pulling element is moved approximately parallel to the vehicle door sill during the tightening process, the belt guide comprising a deflection bar that extends obliquely to a longitudinal center line of the belt webbing guided through the belt guide.

2. The device according to claim 1 wherein during the tightening process the pulling element is moved toward the front of the vehicle.

3. The device according to claim 1 further comprising an electrical cable that extends from the B-column to the linear belt tightener to activate the linear belt tightener.

4. The device according to claim 1 wherein the pulling element is connected to an end of the belt webbing.

5. The device according to claim 1 wherein the pulling element acts upon a belt web loop of the belt webbing guided through the belt guide such that the belt webbing is anchored to the vehicle body.

6. The device according to claim 1 wherein the belt guide is located at approximately a rear end of the vehicle door sill.

7. The device according to claim 4 wherein the belt guide is located at approximately a rear end of the vehicle door sill.

8. The device according to claim 5 wherein the belt guide is located at approximately a rear end of the vehicle door sill.

9. The device according to claim 1 wherein the belt guide is located in a region where the vehicle door sill and the C-column coincide.

10. The device according to claim 1 wherein the belt guide pivots around an anchor.

11. The device according to claim 3 wherein an electrical connection is provided for the cable in the region of the B-column.

12. The device according to claim 11 wherein the electrical connection has an additional connection for an electrical cable for the activation of an additional tightening drive that is located in the region of the B-column.

13. The device according to claim 12 wherein the additional tightening drive drives a seat belt retractor secured to the B-column.

14. A device for tightening a three-point seat belt located in the rear of a vehicle comprising:

a linear belt tightener located in the region of a vehicle door sill that extends between a B-column and a C-column of a vehicle, the linear belt tightener being aligned essentially parallel to the vehicle door sill, the linear belt tightener comprising a pyrotechnically driven piston engaging a pulling element attached to a seat belt webbing that is guided through a belt guide anchored to a vehicle body, the pulling element is moved approximately parallel to the vehicle door sill during the tightening process, the belt guide having a deflection bar that extends obliquely to a longitudinal center line of the belt webbing guided through the belt guide.

15. The device according to claim 14 wherein the belt guide is located at approximately the rear end of the vehicle door sill.

16. The device according to claim 14 wherein the belt guide is located in a region where the vehicle door sill and the C-column coincide.

17. A device for tightening a three-point seat belt located in the rear of a vehicle comprising:

a linear belt tightener located in the region of a vehicle door sill that extends between a B-column and a C-column of a vehicle, the linear belt tightener being aligned essentially parallel to the vehicle door sill, the linear belt tightener comprising a pyrotechnically driven piston engaging a pulling element attached to a seat belt webbing that is guided through a belt guide that is pivotally anchored to a vehicle body, the pulling element is moved approximately parallel to the vehicle door sill during the tightening process, the belt guide having a deflection bar that extends obliquely to a longitudinal center line of the belt webbing guided through the belt guide.

18. The device according to claim 17 wherein the belt guide is located at approximately the rear end of the vehicle door sill.

19. The device according to claim 17 wherein the belt guide is located in a region where the vehicle door sill and the C-column coincide.

* * * * *